UNITED STATES PATENT OFFICE.

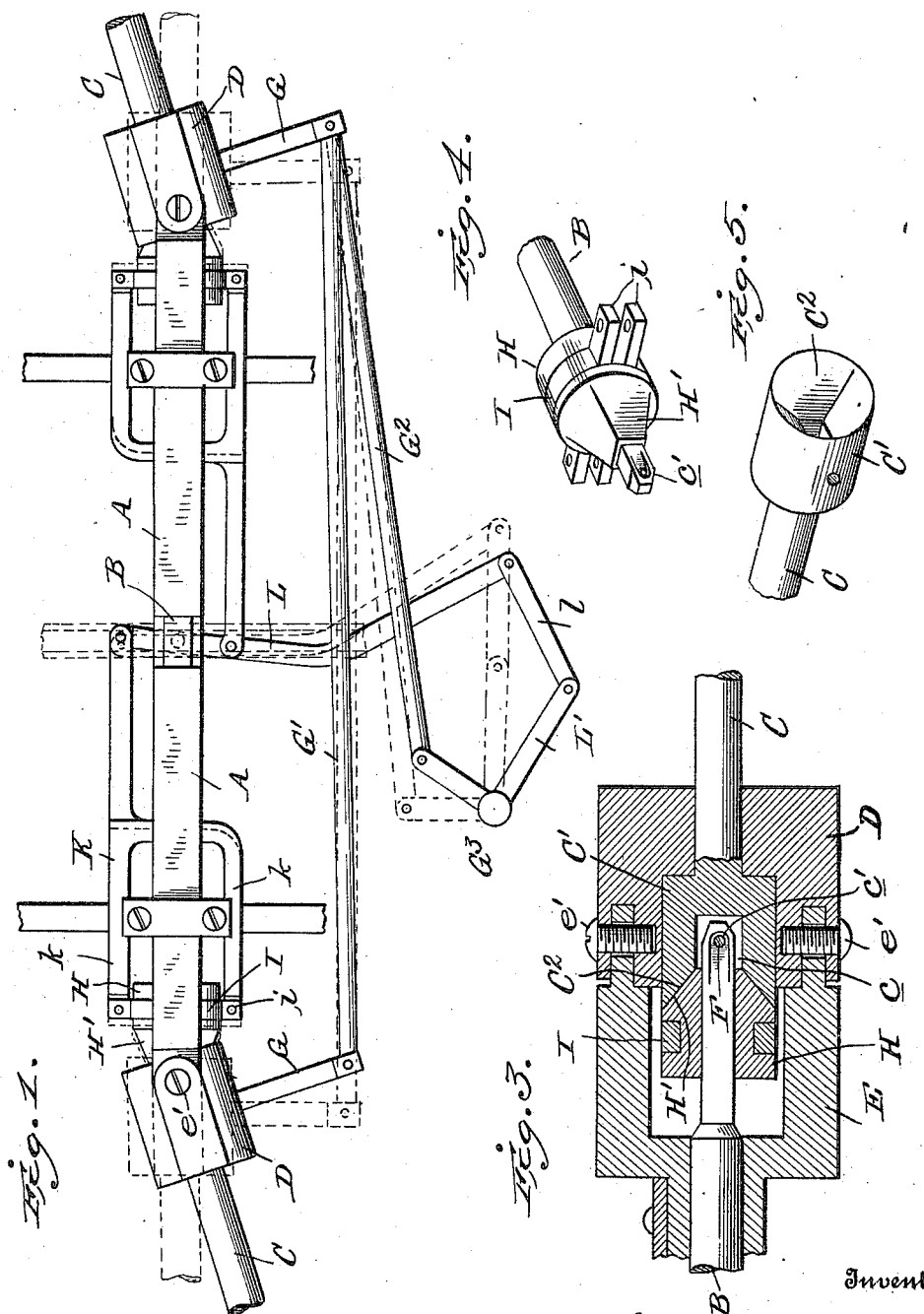

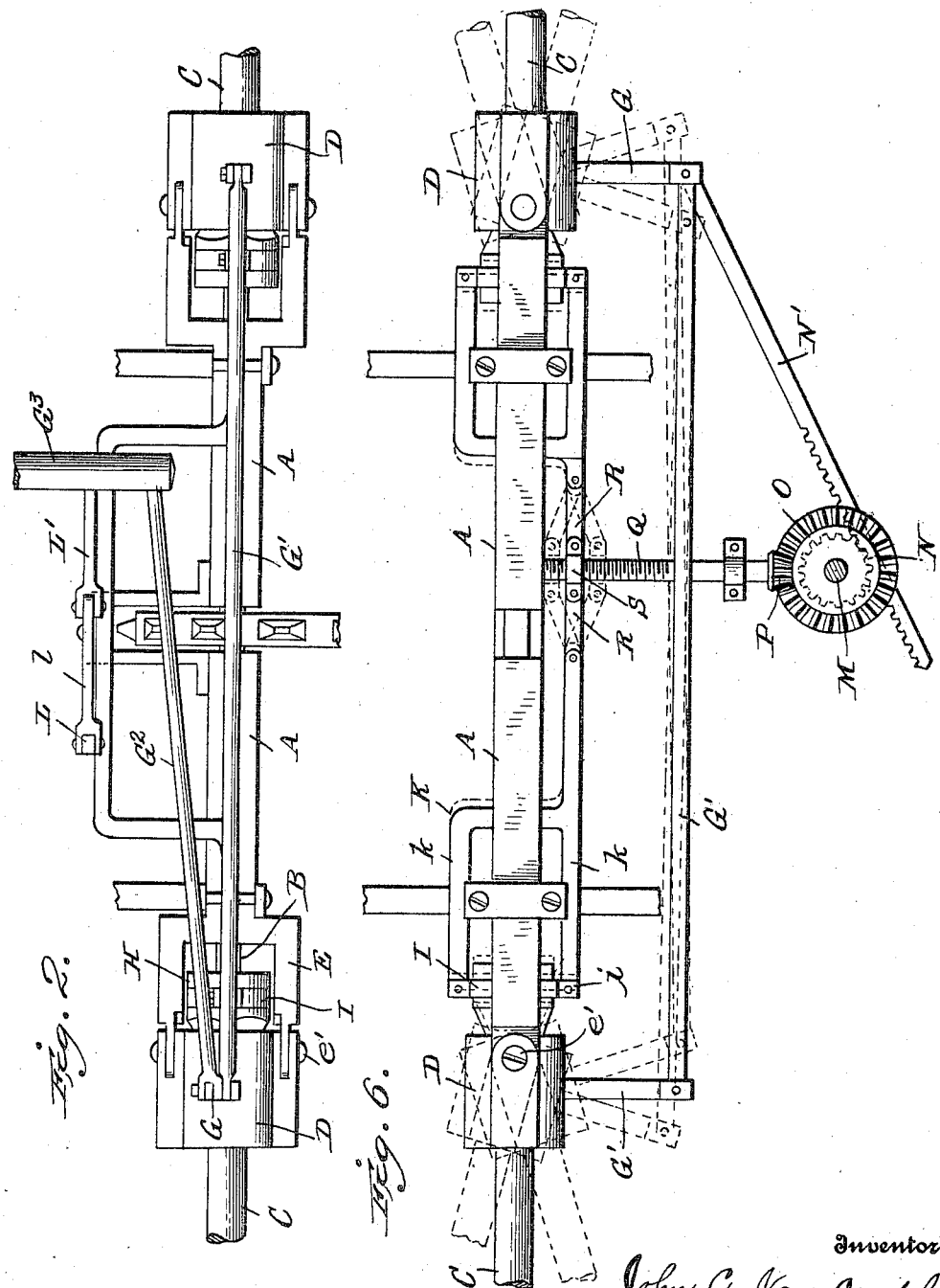

JOHN C. VAN ORSDEL, OF YOUNGSTOWN, OHIO.

DRIVING AND STEERING GEAR FOR SELF-PROPELLED VEHICLES.

998,725. Specification of Letters Patent. Patented July 25, 1911.

Application filed July 19, 1910. Serial No. 572,770.

*To all whom it may concern:*

Be it known that I, JOHN C. VAN ORSDEL, a citizen of the United States, residing at Youngstown, in the county of Mahoning and State of Ohio, have invented certain new and useful Improvements in Driving and Steering Gear for Self-Propelled Vehicles; and I do hereby declare the following to be a full, clear, and exact description of the same, reference being had to the accompanying drawings, forming a part of this specification, and to the figures and letters of reference marked thereon.

This invention relates to steerable self-propelled vehicles, the primary object being to provide a means whereby the steering wheels may serve as driving or traction wheels in addition to the ordinary traction wheels, the driving mechanism employed being such that when a maximum tractive effort is to be exerted the parts may be so associated and connected as to relieve the steering gear of strain.

Further objects of the invention are to simplify and improve the mechanical construction and arrangement of the parts whereby the mechanism may be employed in ordinary motor vehicles without materially increasing the weight and complication of the parts.

Referring to the accompanying drawings—Figure 1 is a bottom plan view of a front axle and steering and driving gear embodying the present invention, the parts being shown in dotted lines in the position assumed by the wheel spindles in running a straight course. Fig. 2 is an elevation of the mechanism and parts shown in Fig. 1. Fig. 3 is a section in a vertical plane through one end of the axle casing, knuckle and clutch with the wheel carrying spindle and axle in elevation. Fig. 4 is a detail perspective view of one end of the axle and longitudinally movable clutch member mounted thereon. Fig. 5 is a similar view of one of the wheel carrying spindles and clutch member forming a part of the same. Fig. 6 is a plan view illustrating a modified arrangement of the steering and driving gear, the parts being shown in dotted lines in different positions assumed by them when the vehicle is being steered to the right or left.

Similar letters of reference in the several figures indicate the same parts.

The axle for the steering wheels is, in accordance with the present invention, composed of a divided housing or casing A having journaled within it a driven axle indicated by the letter B and to the center of which the driving power is applied through any of the usual driving connections, such as a sprocket wheel and chain indicated in dotted lines in the drawings, or a Cardan shaft, it being understood, of course, that the driving connections embody a differential for compensating for the variations in wheel travel in turning curves.

The steering wheels are mounted on and connected with spindles C journaled in knuckled D, said knuckles being hinged on vertical axes at the ends of the axle whereby the steering wheels are adapted to swing in a horizontal plane for guiding the vehicle.

In the preferred construction the ends of the sections of the housing or casing are provided with forked terminals or yokes E and vertically alined pivot pins $e'$ which connect the arms of the yokes and knuckle pieces, as best seen in Fig. 3 of the accompanying drawings. The ends of the axle B project into the yokes and are preferably square or made of irregular section for a purpose which will presently appear and at the extremities they are connected through a universal joint with the inner ends of the spindles C.

As a convenient form of universal joint the inner ends of the spindles are formed with enlargements $C'$ having centrally arranged cavities $c$ for the reception of the ends of the axle. The ends of the axle are provided with transverse apertures $c'$ through which transverse pins F pass for loosely connecting the ends of the axle and spindles, there being a sufficient play and the form of the openings in the axle being such as to permit of the necessary relative angular movement of the parts in steering the vehicle and at the same time maintain a driving connection between the axle and the spindles whereby tractive effort is transmitted to the steering wheels. For manual control of the steering wheels each knuckle is provided with an arm or projection G which arms or projections are connected together by the usual cross rod $G'$ and a link $G^2$ serves to connect the knuckles with the steering post $G^3$.

As thus far described the mechanism constitutes a constant drive gearing for the steering wheels, but the joints interposed in the driving connections at the ends of the spindles constitute not only a source of weakness but, under normal running conditions where the vehicle is traveling a straight course, tend to induce an element of uncertainty in the steering of the vehicle, or the maintaining of the vehicle upon its straight course. In order to overcome these difficulties, as well as to provide a means whereby when running a straight course the spindles of the steering wheels and axle B are locked and operate together as an ordinary driving axle, clutches are interposed between the proximate ends of the steering wheel spindles and axle, which clutches are automatically controlled by the steering gear so as to be withdrawn in proportion to the turning of the knuckles in steering the vehicle.

Conveniently, the inner ends of the spindles C are in the form of clutch members, being for this purpose provided with squared or irregular shaped tapering sockets $C^2$, best seen in Fig. 5, and coöperating clutch members H are mounted to slide upon the squared ends of the axle B so as to enter the sockets $C^2$. The ends of the sliding clutch members H are tapered, as shown at H' in Figs. 3 and 4, to fit within the tapered sockets when the members H are moved outwardly thereby not only locking the axle and spindles together but also holding the spindles rigidly in alinement with the axle. They also restore the spindles to alinement if through wear or looseness of the parts they should tend to swing into an angular position.

For controlling the operation of or the connecting and disconnecting of the clutches, each sliding clutch member H is provided with a ring or band I having laterally extending lugs $i$ projecting in opposite directions and adapted to be connected with arms $k$ of a sliding frame K mounted in suitable guides or ways on the running gear or axle casing, said frames at their inner ends being jointed to an operating lever L. As shown in Figs. 1 and 2, the operating lever L is connected by a link $l$ with an arm L' on the steering post $G^3$ the arrangement being such that the arm L' and link $l$ form a toggle which, when the vehicle is running a straight course has its pivotal points in substantial alinement, as shown by the dotted lines in Fig. 1, and when the vehicle is to be steered or the knuckles turned in a horizontal plane the said toggle will be swung in one direction or the other, thereby turning the lever L on its pivotal center and withdrawing the movable clutch members from engagement with the clutch members on the spindle, as shown by the full lines in Fig. 1.

Various arrangements of clutch controlling connections for releasing the clutches more or less as required by the turning of the knuckles in a horizontal plane will at once suggest themselves and in Fig. 6 I have illustrated one such modified mechanism. Referring to the said Fig. 6, the steering post is indicated by the reference letter M, a rack bar and pinion connections N being employed for transmitting the rotary movement of the steering post through the link N' to the steering wheel knuckles. The steering post M carries a beveled gear wheel O with which a pinion P meshes and the pinion P is adapted to rotate a screw Q for controlling the movement of the clutch operating frames K. As a convenient form of connection between the screw Q and clutch operating frames K toggle links R are pivotally connected with the proximate ends of the frame and with the nut S on the screw Q. Obviously, rotation of the steering post will rotate the screw Q and by moving the nut in one direction or the other from its normal central position, as shown in full lines in Fig. 6, will withdraw the movable clutch sections and permit the steering wheel knuckles to turn in a horizontal plane. The proportioning of the gears is such that the clutch members will be withdrawn in proportion to the turning of the knuckles and when the knuckles are in alinement with the axle the clutches will be fully engaged so as to lock the parts for positive rotary movement, thereby transmitting the power to the steering wheels without losses or strain upon the universal joints.

From the foregoing it will be seen that when the wheel spindles are in alinement with the axle and the vehicle thereby adjusted for progress in a straight line, deflection of the wheels from such position by striking ruts or other obstructions is prevented and furthermore differences in tractive effort transmitted through the wheels to the ground does not cause a swerving of the vehicle from its straight-away course. Steering of the vehicle is not interfered with because the initial movement of the steering wheel instantly releases the clutches to a sufficient degree to permit the inauguration of the swinging movement of the wheels in a horizontal plane. The clutches are moved out of engagement in proportion to the steering movement of the wheels and are only restored to their fully engaged positions when the spindles of the steering wheels are brought back into alined position.

Having thus described my invention, what I claim as new and desire to secure by Letters Patent of the United States is—

1. In a self-propelled vehicle, the combination with the axle and steering wheel spindles pivotally connected with the ends of the axle to swing in a horizontal plane for steering the vehicle, of clutches interposed between the axle and steering wheel spindles and each embodying a member movable bodily toward and from the spindles for locking the spindles in alined position, means for simultaneously releasing both clutches and means for positively swinging the spindles on their pivotal centers for steering.

2. In a self-propelled vehicle, the combination with the axle and steering wheel spindles pivoted on independent axes to swing in a horizontal plane for steering the vehicle, of clutches interposed between the axle and steering wheel spindles and each embodying a member movable bodily toward and from the spindles for locking the spindles against swinging movement, manually operated control mechanism for positively swinging the spindles to steer the vehicle and connections between said control mechanism and clutches, whereby the clutches are simultaneously released when the spindles are swung for steering.

3. In a self-propelled vehicle, the combination with the axle, steering wheel spindles pivoted on independent axes to swing in a horizontal plane for steering, and driving connections between the spindles and axle, of clutches having members which coöperate to lock the spindle against swinging movement a steering gear connected with the spindles for positively swinging the same to steer the vehicle, and means for simultaneously releasing both the clutches connecting the axle and spindles.

4. In a self-propelled vehicle, the combination with the driven axle, steering wheel spindles pivoted to swing in a horizontal plane for steering, and universal joint connections between the axle and spindles for driving, of oppositely arranged clutches for connecting the axle and spindles when in alined position to lock the spindles against swinging movement, means for simultaneously releasing the clutches, and means for positively swinging the spindles to steer the vehicle.

5. In a self-propelled vehicle, the combination with the driven axle, steering wheel spindles pivoted to swing in a horizontal plane for steering, and universal joint connections between the axle and spindles for driving, of coöperating clutch sections on the axle and spindle embodying tapered male and female members coöperating to lock the axle and spindles in alined position, means for releasing the clutches, and means for positively swinging the spindles to steer the vehicle.

6. In a self-propelled vehicle, the combination with the axle embodying a housing and a driven axle journaled therein, knuckles hinged to the ends of the housing to swing in a horizontal plane and steering wheel spindles journaled in the knuckles, of clutches interposed between the spindles and driven axle and coöperating to lock the spindles against swinging movement, and means for simultaneously releasing said clutches and positively swinging the knuckles, and spindles for steering the vehicle.

7. In a self-propelled vehicle, the combination with the axle embodying a housing and a driven axle journaled therein, knuckles hinged to the ends of the housing to swing in a horizontal plane and steering wheel spindles journaled in the knuckles, of clutches interposed between the spindles and driven axle, means embodying a toggle link connection movable in opposite directions away from its center for simultaneously releasing said clutches, and means associated with the clutch releasing means for positively swinging the knuckles, and spindles for steering the vehicle.

8. In a self-propelled vehicle, the combination with the axle embodying a housing and a driven axle journaled therein, knuckles hinged to the ends of the housing to swing in a horizontal plane and steering wheel spindles journaled in the knuckles, of clutches interposed between the spindles and driven axle, means embodying a toggle link connection movable in opposite directions away from its center for simultaneously releasing said clutches, operating gearing for moving said toggle link connection in either direction, and connections between said operating gearing and knuckles for positively steering the vehicle when the clutches are released.

9. In a motor vehicle, a pair of suitably supported spaced housings having forked terminals, a driven axle supported for rotation in the housings and having squared terminals, knuckles connected pivotally with the yokes of the housings for movement in a horizontal plane, spindles supported for rotation in the knuckles and having heads provided with tapered non-circular recesses and with sockets wherein the squared ends of the axle are connected for universal movement, sleeves slidable upon the squared axle ends and having tapered non-circular projections, and means for simultaneously oscillating the knuckles and sliding the sleeves upon the axle ends, the parts being so adjusted that when the spindles are in alinement with the axle, the tapered projections of the sleeves shall engage the corresponding recesses of the spindle heads.

10. In a motor vehicle, a pair of suitably supported housings having forked ends, a driven axle supported for rotation in the housings and having squared ends, knuckles hingedly connected with the yokes of the housings, spindles supported for rotation in the knuckles and connected for universal movement with the ends of the axle, sleeves slidable upon the squared portions of the axle and adapted for locking engagement with the spindles, and manually operated means for positively effecting simultaneous adjustment of the knuckles and the sleeves.

11. A pair of suitably supported housings having forked ends, a driven axle supported for rotation in the housing and having squared ends, knuckles hingedly connected with the yokes of the housings, wheel carrying spindles supported for rotation in the knuckles and connected for universal movement with the ends of the axle, sleeves slidable upon the squared portions of the axle and adapted for locking engagement with the wheel carrying spindles, rings fitted in annular grooves upon the sleeves and having laterally extending lugs, arms extending from the knuckles, a rod connecting said arms, a suitably supported lever, arms connected with said lever at opposite sides of the fulcrum and having terminal forks connected with the lugs of the rings engaging slidable sleeves, a steering post having crank arms, a link connecting one of said arms with the sleeve adjusting lever, a link connecting the other crank arm with the arm extending from one of the knuckles.

JOHN C. VAN ORSDEL.

Witnesses:
W. L. McCRACKEN,
ANNA M. DAVIS.

Copies of this patent may be obtained for five cents each, by addressing the "Commissioner of Patents, Washington, D. C."